(12) United States Patent
Hayashi

(10) Patent No.: US 6,328,785 B1
(45) Date of Patent: Dec. 11, 2001

(54) METHOD OF DEGASSING AQUEOUS COATING SOLUTION

(75) Inventor: Kenji Hayashi, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/459,563

(22) Filed: Dec. 13, 1999

(30) Foreign Application Priority Data

Dec. 11, 1998 (JP) .................................................. 10-352223

(51) Int. Cl.$^7$ ................................................. B01D 19/00
(52) U.S. Cl. ............................................... 95/46; 96/6
(58) Field of Search .................................. 95/46; 96/6

(56) References Cited

U.S. PATENT DOCUMENTS

| | | | |
|---|---|---|---|
| 4,257,257 | * | 3/1981 | Dairaku et al. ............................ 96/6 X |
| 4,539,113 | * | 9/1985 | Tomita et al. ............................. 96/6 X |
| 4,702,102 | * | 10/1987 | Hammerton ............................. 96/6 X |
| 4,729,773 | * | 3/1988 | Shirato et al. .............................. 96/6 |
| 4,869,732 | * | 9/1989 | Kalfoglou ................................ 95/46 |
| 5,425,803 | * | 6/1995 | Van Schravendijk et al. ........... 95/46 |
| 5,762,684 | * | 6/1998 | Hayashi et al. ........................ 95/46 X |
| 5,788,742 | * | 8/1998 | Sugimoto et al. ........................ 95/46 |
| 5,830,261 | * | 11/1998 | Hamasaki et al. .................... 95/46 X |
| 5,888,275 | * | 3/1999 | Hamasaki et al. .................... 95/46 X |
| 5,981,614 | * | 11/1999 | Adiletta ................................ 95/46 X |
| 6,033,475 | * | 3/2000 | Hasebe et al. ......................... 96/6 X |
| 6,086,768 | * | 7/2000 | Sims .................................... 95/46 X |
| 6,126,725 | * | 10/2000 | Tateyama .................................. 96/6 |
| 6,168,648 | * | 1/2001 | Ootani et al. ............................ 95/46 |

FOREIGN PATENT DOCUMENTS

| | | | |
|---|---|---|---|
| 3822093 | * | 1/1989 | (DE) ........................................ 95/46 |
| 0376638 | * | 7/1990 | (EP) ......................................... 96/6 |
| 51-35259 | | 10/1976 | (JP) . |
| 1-007916A | * | 1/1989 | (JP) ........................................ 95/46 |
| 1-038105A | * | 2/1989 | (JP) ........................................ 95/46 |
| 1-215312A | * | 8/1989 | (JP) ........................................ 95/46 |
| 1-299612A | * | 12/1989 | (JP) ........................................ 95/46 |
| 2-290201A | * | 11/1990 | (JP) ........................................ 95/46 |
| 3-154601A | * | 7/1991 | (JP) ........................................ 95/46 |
| 6-335623 A | | 12/1994 | (JP) . |

* cited by examiner

*Primary Examiner*—Robert H. Spitzer
(74) *Attorney, Agent, or Firm*—Sughrue, Mion, Zinn, Macpeak & Seas, PLLC

(57) ABSTRACT

The method of degassing an aqueous coating solution having a viscosity of 1 centipoise or more comprises using a fluoro resin film as the degassing membrane and can degas fast without the generation of microbubbles which causes coating troubles even in the case of the solutions having a high viscosity.

5 Claims, 1 Drawing Sheet

METHOD OF DEGASSING AQUEOUS COATING SOLUTION

BACKGROUND OF THE INVENTION

This invention relates to a method of degassing an aqueous solution for the prevention of coating troubles in a process of delivering the aqueous solution and applying it to a web.

In general, when a coating solution containing dissolved air or bubbles is applied to a web, it is difficult to form a uniform coating membrane because of the occurrence of longitudinal streaks, pinholes and the like. Thereupon, in the case of precise coating membranes, the coating solutions therefor need to remove dissolved air and bubbles from them prior to coating.

Heretofore, various degassing methods have been proposed. For example, the degassing method disclosed in Japanese Patent KOKAI 6-335623 comprises using a composite membrane which is a hollow fiber composed of a porous membrane (4-methylpentene-based polymer) and a nonporous membrane. Japanese Patent KOKOKU 51-35259 discloses a continuous degassing apparatus comprising introducing a high viscosity liquid into a reduced pressure chamber, reducing the viscosity temporarily by heating, streaming it on a wetting wall having a surface area gradually increasing from the top to the underside in a tower to decrease membrane pressure, and degassing by sucking the reduced pressure chamber by a vacuum pump. Japanese Patent KOKAI 64-38105 discloses a treating of silver halide emulsion for photograph which comprises passing the emulsion containing dissolved air and microbubbles on the outside of a porous polymer membrane tube to be stored in a jacket, and removing the dissolved air and microbubbles while sucking the inside of the tube and pressuring the emulsion. Japanese Patent KOKAI 9-225206 discloses a degassing apparatus using a membrane of tetrafluoroethylene-hexafluoropropylene copolymer. Thus, degassing apparatus was developed in order to solve a problem of a conventional degassing apparatus using a porous polymer membrane in degassing solvent solutions, oils, fats, and solutions containing surfactant which tends to permeate liquid to wet, and thereby, loses degassing ability.

However, when a high viscosity aqueous coating solution is degassed by the degassing under reduced pressure, microbubbles are generated in the solution. Since the coating solution has a high viscosity, the generated microbubbles cannot be separated by flotation, and are delivered to a coater to cause coating troubles. The degassing apparatus using a membrane of tetrafluoroethylene-hexafluoroethylene copolymer were developed for degassing solutions having affinity to porous polymer membranes such as organic solvent solutions, oils, fats, surfactant solutions, and the patent application is quite silent about high viscosity solutions and solutions containing a water-soluble polymer.

SUMMARY OF THE INVENTION

An object of the invention is to provide a degassing method of an aqueous coating solution capable of avoiding coating troubles caused by dissolved air and bubbles, even in the case of a high viscosity solution.

The inventors investigated a method of not inducing coating troubles caused by dissolved air and bubbles even in the case of a high viscosity solution, and found that fluoro resin films are particularly suitable as the degassing membrane for the above object, and it is possible to degas up to a desired degassed level of a viscous aqueous coating solution without generating microbubbles.

Thus, the present invention provides a method of degassing an aqueous coating solution having a viscosity of 1 centipoise or more which comprises using a fluoro resin film.

Figure 1:
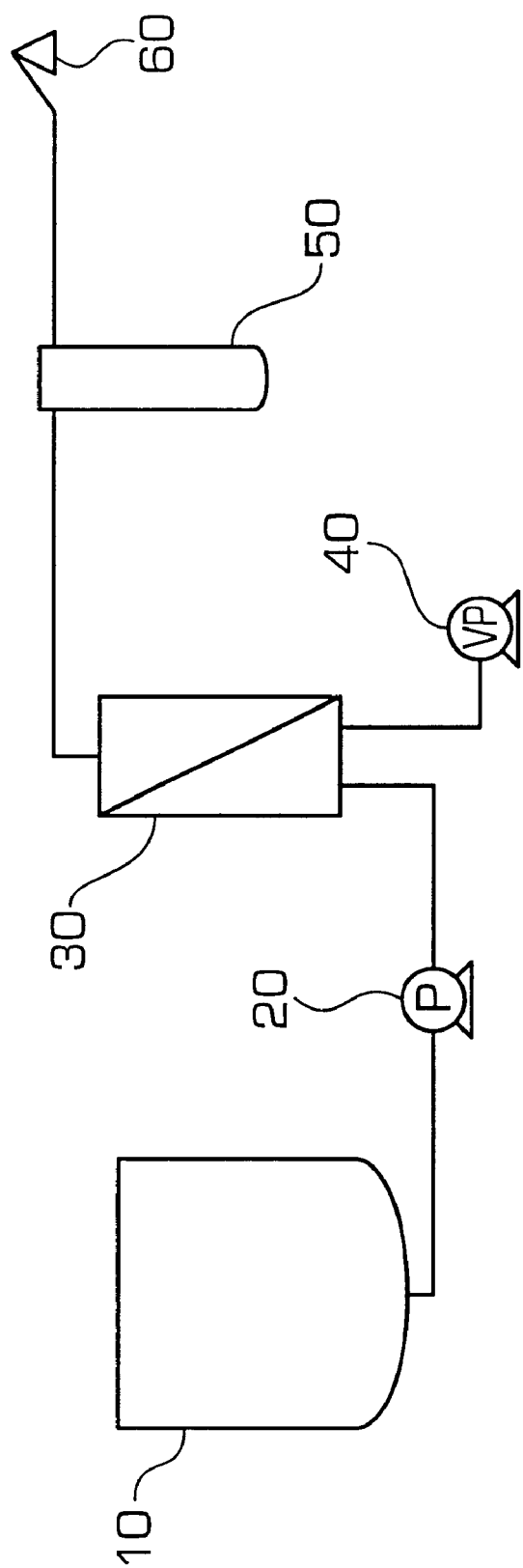
FIG. 1 is a schematic flow diagram illustrating a degassing apparatus to which the method of the invention can be applied.

10 . . . Tank
20 . . . Delivery pump
30 . . . Degassing apparatus
40 . . . Vacuum pump
50 . . . Filtration apparatus
60 . . . Coater

DETAILED DESCRIPTION OF THE INVENTION

In the degassing of an aqueous coating solution of the invention, the degassing membrane is formed of a fluoro resin film, preferably tetrafluoroethylene-hexafluoropropylene copolymer resin film, tetrafluoroethylene-perfluoroalkoxyethylene copolymer resin film or tetrafluoroethylene-ethylene copolymer resin. The fluoro resin film is nonporous film. A suitable thickness of the fluoro resin film is about 10 to 100 $\mu$m, preferably about 20 to 50 $\mu$m.

The aqueous coating solution to be degassed is viscous, and contains a water-soluble polymer, such as vinyl-based polymers, e.g. polyvinyl alcohol, polyvinyl acetate, polyvinyl pyrrolidone, etc., an acrylic acid-based or methacrylic acid-based polymer e.g. polyacrylic acid, polymethacrylic acid, acrylic acid-based copolymers, and the like. The content of the water-soluble polymer is, in general, about 40 wt. % or less, particularly 10 to 40 wt. %. The viscosity of the aqueous coating solution for which the method of the invention is effective is 1 centipoise or more, preferably 5 centipoises or more, particularly preferably 10 centipoises or more. The upper end of the viscosity depends on the permeability of the coating solution through the fluoro resin film, and practically about 40 centipoises. The aqueous coating solution is for forming a photographic photosensitive layer, a photosensitive printing plate or the like.

The fluoro resin film is mounted in an airtight casing, and supplied to use as a degassing apparatus. A conventional microfiltration apparatus or ultrafiltration apparatus can be used as the degassing apparatus. Commercial microfiltration apparatus equipped with the fluoro resin film are also available.

The aqueous coating solution flows on the fluoro resin film while only dissolved air and bubbles pass through the fluoro resin film. The degassing pressure (in the exhaust gas chamber) is preferably 30 torr (mmHg) or less, more preferably 10 torr or less. The degassing temperature is not limited so far as not denaturing the aqueous coating solution, and may be 10 to 70° C.

Although a suitable degassing degree varies according to products, particularly delivered volume of the aqueous coating solution, coating method and tendency of the occurrence of troubles, in general, a suitable degassing degree is 90% or less, preferably 80% or less. The degassing degree=(ppm after degassing/ppm before degassing)×100.

A suitable residual amount of dissolved air and bubbles after the degassing varies according to products, and in the case of photographic emulsion, 6 ppm or less, preferably 4 ppm or less, as oxygen amount.

The degassed aqueous coating solution is subjected to application. The coating layer may be single layer or multilayer, and a multilayer coater is usable. The web material to be coated with the aqueous coating solution may be aluminum web, polyester web, such as PET web, or the like.

An apparatus for carrying out the method of the invention is illustrated in FIG. 1. The apparatus is composed of a tank 10 for storing the aqueous coating solution, a membrane degassing apparatus 30 connected to the tank 10 through a delivery pump 20, a filtration apparatus 50 connected to the outlet of the degassing apparatus 30, a vacuum pump 40 also connected to the degassing apparatus 30, and a coater 60 connected to the filtration apparatus 50. The degassing apparatus 30 is equipped with a fluoro resin film as the degassing membrane. The filtration apparatus is provided for the removal of foreign materials, such as solid particles and coagulated matters. In the above apparatus, the aqueous coating solution stored in the tank 10 is delivered by the pump 20 to the membrane degassing apparatus, the filtration apparatus 50 and then the coater 60. Meanwhile, dissolved air and bubbles in the aqueous coating solution permeates the degassing membrane while passing through the degassing apparatus 30, and are removed.

According to the method of the invention, even in the case of degassing an aqueous coating solution having a high viscosity, microbubbles do not generate, and accordingly, the aqueous coating solution delivered to the coater does not contain bubbles, thereby preventing coating troubles caused by bubbles. A period for defoaming to stabilize degassing degree (waiting period) can be omitted upon starting of coating.

EXAMPLES

The degassing membrane used was a tetrafluoroethylene-hexafluoropropylene copolymer resin film having a thickness of 25 $\mu$m, and degassing was carried out under the following conditions:

Aqueous coating solution: Water 94 wt. %
  Polyvinyl alcohol 5 wt. %
  Surfactant 1 wt. %
  Dissolved oxygen 8 ppm
  Viscosity 10 c.p. at 25° C.
Flow rate: 1.0 l/min
Pressure on the reduced pressure side: 30 torr The results are summarized in Table 1.

TABLE 1

| Time (min) | Example Membrane Degassing | Comparative Suction Degassing |
| --- | --- | --- |
| 10 | None | Generation of microbubbles |
| 20 | None | Generation of microbubbles |
| 30 | None | Generation of microbubbles |

Generation of microbubbles were evaluated by the bubble inspection and the like.

As can be seen from Table 1, microbubbles did not generate at all, and liquid leakage was also not found.

Subsequently, degassing was carried out in a circulating system of the aqueous coating solution, and the residual dissolved oxygen was measured with time. The results are shown in Table 2.

TABLE 2

| | Residual Rate of Dissolved Oxygen (%) | |
| --- | --- | --- |
| Time (min) | Example Membrane Degassing | Comparative Suction Degassing |
| 0 | 100 | 100 |
| 10 | 88.9 | 92.6 |
| 20 | 51.9 | 87.7 |
| 30 | 40.7 | 85.2 |

What is claimed is:

1. A method of degassing an aqueous coating solution containing a water-soluble polymer having a viscosity of 1 centipoise or more which comprises flowing the aqueous coating solution on one side of a nonporous fluoro resin film having a thickness of 10 to 100 $\mu$m, and reducing the pressure on the opposite side of the film to pass dissolved air and bubbles in the aqueous coating solution through the fluoro resin film, wherein the water-soluble polymer is selected from the group consisting of a vinyl-based polymer, an acrylic acid-based polymer and a methacrylic acid-based polymer.

2. The method of claim 1 wherein the fluoro resin film is a tetrafluoroethylene-hexafluoroethylene copolymer resin film.

3. The method of claim 1 wherein the water-soluble polymer is a member selected from the group consisting of polyvinyl alcohol, polyvinyl acetate, polyvinyl pyrrolidone, polyacrylic acid, polymethacrylic acid and acrylic acid-based copolymers.

4. The method of claim 1, wherein the water-soluble polymer has a viscosity of 5 to 40 centipoises.

5. The method of claim 1, wherein the reduced pressure is 30 torr or less.

* * * * *